Dec. 5, 1944.　　L. F. SARNES　　2,364,165
REAR VIEW MIRROR
Filed May 1, 1942
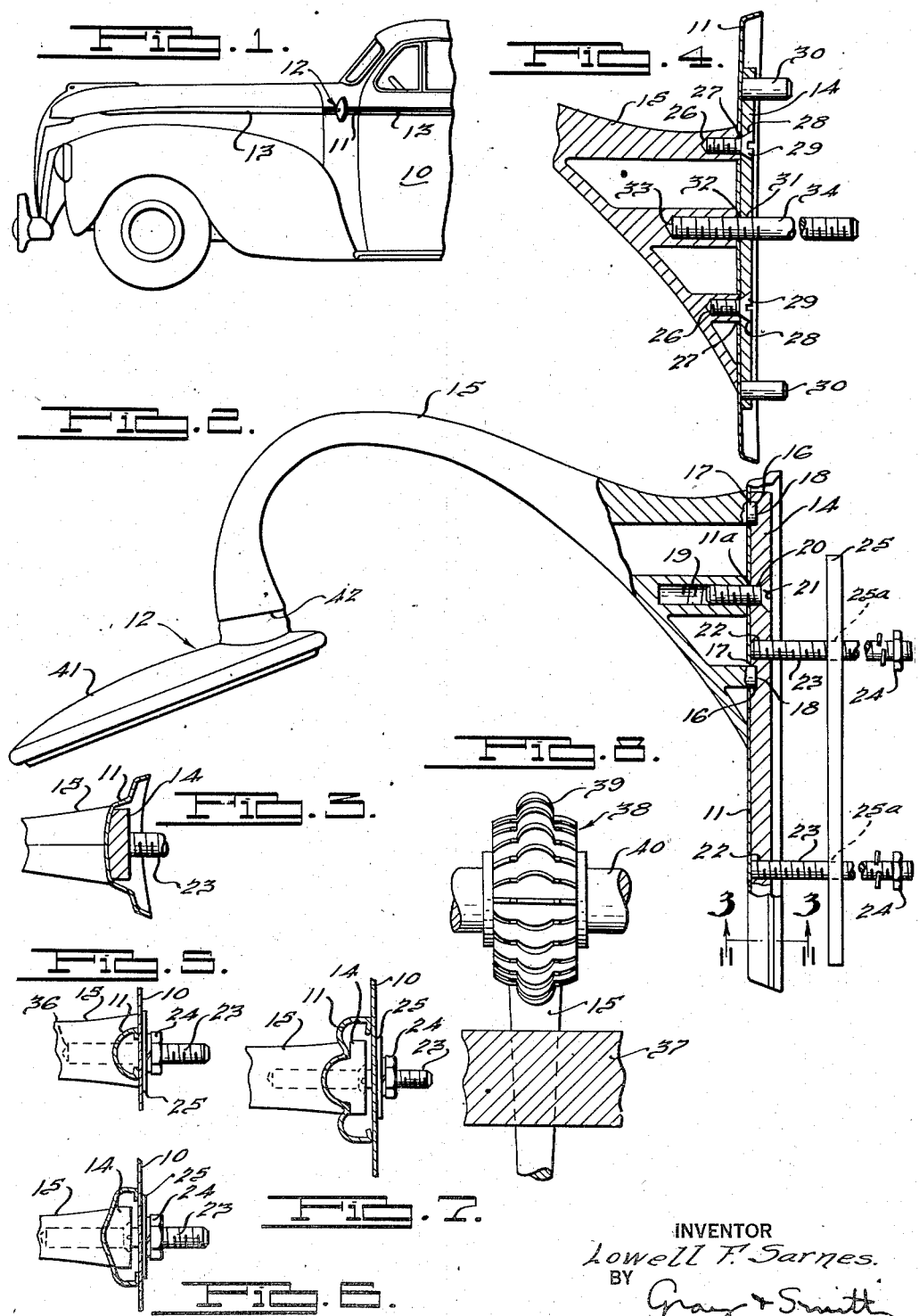
INVENTOR
Lowell F. Sarnes.
BY
Gray & Smith
ATTORNEYS.

Patented Dec. 5, 1944

2,364,165

UNITED STATES PATENT OFFICE 2,364,165

REARVIEW MIRROR

Lowell F. Sarnes, Dearborn, Mich., assignor to Monarch Governor Company, Detroit, Mich., a corporation of Michigan Application May 1, 1942, Serial No. 441,305

8 Claims. (Cl. 248—226)

The present invention relates to rear view mirrors and particularly to an improved rear view mirror assembly attachable to the outside of a motor vehicle body at the side of the cowl or hood thereof in advance of the front door.

In accordance with conventional construction in certain motor vehicle bodies a belt line molding or beading is provided about portions of the exterior of the body chiefly for decorative purposes. This molding or beading is usually in sections extending in abutting relation along the body so as to give the effect or appearance of a continuous molding. I have found that the height and position of this molding are such as to permit the rear view mirror to be mounted advantageously at the locality of one section of the molding especially at a point in advance of the front door of an automobile between the door and hood thereof. Thus, in the instance of a rear view mirror to be mounted on the side of the body in advance of the front door, a section of the belt line molding or the equivalent in appearance may be used as a support for the mirror. This avoids the necessity of attaching the mirror to the upper outside hinge or the front marginal flange of the door as has been customary. In the case of cars having concealed front door hinges, this will provide an immediately available mounting means which is not available where the door hinges are concealed.

It is the principal object of the present invention to provide a structure in which a mirror assembly and a member adapted to form or take the place of a section of the belt line molding are combined, and one which is adapted to be mounted directly upon the exterior of a vehicle body and which is, after mounting, adapted to form a harmonious part of the said belt line molding.

It is another object of the invention to provide a mirror device of the foregoing character having a base comprising an actual section of the continuous belt line molding, or a duplicated section thereof, said device having a separate arm attached at its inner end to the base such as by screw and dowel means and shaped at said inner end to conform substantially to the contour of the belt molding.

Another object of the invention is to provide a mirror device of the foregoing character having a base comprising an actual or duplicated section of the continuous belt line molding of the vehicle body, said device having a separate arm attached to the base by screw means and adapted to be mounted into position on the automobile body by screw and dowel means.

A further object of the invention is to provide a device of the foregoing character having a sheet metal base which is adapted to replace a portion of a belt line molding and to be held in place by the same or part of the same fastening means utilized to retain in place such portion of the molding so that no additional apertures or other alterations in the vehicle body need be made in order to install the device.

A further object of the invention is to provide a mirror assembly of the foregoing character having an improved base formed and designed to replace a section of the belt line molding, said device having a separate arm attached to the base by a screw or screws which are inaccessible when the base is mounted in position on the automobile body, thus preventing theft of the mirror.

It is still another object of the invention to provide a mirror assembly of the above character which may be easily installed, one which is compact in structure, attractive in appearance and adapted for use on a conventional vehicle body.

Other objects of this invention will appear in the following description and appended claims, reference being had to the accompanying drawing forming a part of this specification wherein like reference characters designate corresponding parts in the several views.

Fig. 1 is a fragmentary side elevation view of a vehicle body showing the present invention applied thereto.

Fig. 2 is an enlarged plan view partly in section illustrating one embodiment of the invention.

Fig. 3 is an enlarged sectional view taken along the lines 3—3 of Fig. 2 looking in the direction of the arrows.

Fig. 4 is a view somewhat similar to Fig. 2 illustrating another embodiment of the invention.

Figs. 5, 6 and 7 are fragmentary sectional views illustrating belt line molding base sections of different configurations and the modes of attachment of the mirror arms or brackets thereto.

Fig. 8 is an enlarged view in elevation illustrating a device for shaping the inner end of the mirror arm.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

In the embodiment of the invention herein shown the mirror assembly comprises in general a separate metallic attaching plate or strip 11 to which a mirror unit designated in general by reference numeral 12 is fixed. On being applied to the vehicle body as shown in Fig. 1, the present mirror assembly is particularly adapted to replace or take the place of a section of the belt line molding 13, especially that section normally fixed to the cowl portion of the vehicle body, and is preferably adapted to utilize part of or the same fastening means otherwise used to retain that section in place. However, it is to be understood that the assembly may form a continuous part of a belt line molding having no removable section and may be attached directly to the molding at the desired location.

The attaching plate 11 is preferably metallic in structure and is shaped to appear like the particular belt line molding 13 with which its use is contemplated and it follows, therefore, that it may comprise an actual section of the continuous belt line molding. The plate 11 may have one of many designs and finishes dependent upon its intended use. In length, plate 11 is made suitable to replace a given removable section of the belt line molding 13, especially that section normally applied to the cowl portion of the vehicle body. Consequently, the length of the plate may also vary, dependent upon the particular use to which the mirror assembly is put.

As shown in Fig. 2, the base 11 comprises a pressed metal shell or channel piece which is adapted to receive along its inner surfaces a metallic backing plate or reinforcing bar 14 having a surface shaped to conform substantially to the shape of the inner bottom surface of the base 11. The bar 14 has sufficient thickness to give rigidity to the base 11 so as to adequately support the mirror arm 15 at the same time to provide a supporting means for attaching elements by which the base assembly is secured to the exterior of the vehicle body 10.

In the preferred embodiment the mirror supporting arm 15 is shaped at its inner end to fit the outer face of the base member 11 and is keyed thereto by means of two studs 16 and a screw 21. In the assembled position of the base and arm each of the studs or dowel pins 16 extends integrally from the inner end of the arm 15 through correspondingly shaped apertures 17 formed in the wall of the base 11 thence into blindly terminating correspondingly shaped holes or recesses 18 formed in the reinforcing bar 14. The inner end of the arm 15 is further provided with a blindly threaded aperture or tapped hole 19 adapted to register with apertures 11a and 20 of the base plate 11 and reinforcing bar 14, respectively, whereby the screw 21 may extend through apertures 20 and 11a into the threaded hole 19 and thereby firmly secure the backing strip 14, the base 11 and arm together, the dowels 16 further assisting in keying the arm 15 to the base 11 so that unwanted turning of the arm will not occur.

The backing strip 14 is provided with a pair of tapped holes 22, each of which is preferably positioned to register with one of a pair of apertures (not shown) in the vehicle body 10. Each of the openings 22 is formed to receive one of the threaded studs or fastening elements 23. To install the base 11 in alinement with the belt line molding 13 of the vehicle body 10, the studs 23 secured to the backing plate 14 are inserted through apertures in the cowl panel of the vehicle body and nuts 24 applied to the studs and tightened against a clamping bar or plate 25 having apertures 25a to permit the bar to slide longitudinally upon the studs, thus clamping the base tightly to the cowl panel.

The embodiment shown in Fig. 4 is substantially the same as the above described embodiment of the invention with the exception that the inner end of the arm instead of being provided with studs is provided with a pair of blind threaded apertures or tapped holes 26, each in alinement with apertures 27 and 28 formed in the base 11 and backing plate 14, respectively, and adapted to accommodate screws 29 in such a manner that said screws extend into the threaded apertures 26 to firmly secure or key the arm 15 to the base 11. In this embodiment the base 11 is secured to the vehicle body 10 by means of two dowels 30 and a threaded attaching stud 34. Each of the dowels 30 is rigidly secured adjacent the ends of the backing plate 14 and is positioned to register with and to extend through one of a pair of apertures (not shown) in the cowl panel of the vehicle body 10. Alined apertures 31 and 32 formed in the backing plate 14 and base plate 11 are adapted to register with a tapped hole 33 formed in the inner end of the arm 15 to permit one threaded end of the attaching stud 34 to extend through the bar 14 and base 11 into the aperture 33. The other threaded end of said stud is adapted to extend through an opening in the vehicle body 10 and is adapted to receive a nut for tightening and clamping the base tightly to the body panel. By this arrangement of two dowels and one threaded attaching stud the mirror arm and base may easily and simply be secured or keyed against unwanted turning to the side of the vehicle body panel 10 in alinement with the belt line molding 13.

In the embodiments of Figs. 5 to 7 inclusive several types of belt line molding common or adaptable to modern motor vehicles are illustrated. These views show the manner of shaping the inner end of the mirror arm 15 to accommodate such molding.

It will be noted in Fig. 5 that the inner end of the arm 15 completely encases the outer surfaces of the channel shaped base plate 11. Also the base 11 is of itself sufficiently rigid so that the reinforcing bar or backing plate 14 may be eliminated. In this embodiment the mirror arm 15 and base 11 are attached directly to the side of the vehicle body 10 by means of attaching studs 23, as in Fig. 2, each of which passes directly through registering openings in the body 10 and base 11 and extends into a blindly terminating threaded hole 36 formed in the inner end of the arm 15. The nut 24 is drawn tightly against the clamping plate 25 to hold the assembly securely in position on the body.

Figs. 6 and 7 illustrate a construction generally similar to that shown in Fig. 2. These views show the differences in the shape or configuration of two types of belt line molding and illustrate how the inner ends of the mirror arms 15 and the surfaces of the backing plate 14 may be shaped to conform to the irregularities of the surfaces of the base molding. In each instance it will be noted that the reinforcing bar is constructed so that it will adequately stiffen the sheet metal molding section 11 so that when screwed together they in effect form a single base member.

Fig. 8 illustrates a device by which the inner end of the mirror arm may be milled to conform to a desired configuration of a belt line molding. As shown, the mirror arm 15 is secured within a molding member 37. A milling wheel 38 having a cutting surface 39 conforming to the contour of the belt molding is affixed to a rotating shaft 40. As illustrated, this wheel is used to mill the inner end of the arm 15 to obtain the desired shape.

Attached to the outer end of the arm or bracket 15 is a suitable mirror head comprising a silvered glass or an equivalent reflector encased within and retained by a metallic backing 41. The backing 41 is connected to the outer end of the arm 15 by pivotal means 42 so that the position of the reflecting surface is rendered adjustable.

The mirror assembly, such as the embodiment shown in Fig. 2, may be applied to the cowl panel of a vehicle body 10 in the following manner. A section of the belt line molding 13 is removed by taking out the screws or fastening elements used to retain that section. The reinforced plate or molding strip 11, to which the mirror unit 12 is firmly fixed by means of the two dowels 16 and the screw 21, then replaces the removed molding section. The fastening elements 23 secured to the reinforcing bar 14 are inserted through two correspondingly located apertures in the vehicle body after which nuts 24 are applied at the inside of the cowl panel, thus securing the assembly to the vehicle body. It will be noted that the described structure requires no new openings in the vehicle body 10. Hence, the assembly may be very conveniently and readily applied by a simple manual operation.

It is pointed out, however, that fastening elements other than those employed to retain the belt line molding may be utilized to secure the assembly to the vehicle body. In the latter event the openings 22 may be arranged wherever desired on the bar 14 as they would not have to be alined with any openings in the vehicle body. In addition, other suitable means of securing the plate 11 and consequently the entire assembly in place may be employed if desired such, for example, as by welding. Moreover, the assembly may form a part of a permanently fixed belt line molding rather than being applied in place of a removable section thereof. In the latter event the assembly is mounted on the vehicle body together with the belt line molding and is secured to the body of the latter, the plate 11 forming a continuous section of the molding. Naturally, in this instance, the means used to secure the molding in place is also used to retain the mirror assembly. It will be readily appreciated under such circumstances that my assembly may be removable or not, depending upon the means used to apply it to the vehicle body.

I claim:

1. A rear view mirror assembly for a vehicle body having a belt line molding provided with a removable section, comprising a mirror unit and a shank attached at its outer end thereto, a hollow attaching plate having a reinforcing member independent of said plate housed from end to end therein, screw and dowel means for securing the inner end of said shank to said attaching plate and reinforcing member, said attaching plate being shaped and dimensioned like the said section of the molding and mounted in place of the said removable section in alinement with and entirely between the separated ends of the fixed portion of the molding thereby forming a continuous portion of the molding, and means secured to said reinforcing member for attaching the assembly to the body.

2. A mounting for a rear view mirror on an automobile body comprising a hollow sheet metal base plate having a reinforcing member housed therein and formed to replace the section of garnish or belt line molding between the door and hood of the automobile, said base plate having apertures registering with recesses formed within said reinforcing member, said reinforcing member having a surface shaped to conform to the inner surface of said base plate, a mirror supporting arm fitting against said base plate and provided with pins or studs fitting through the apertures in said plate into said recesses, screw means for locking said reinforcing member, base plate and mirror supporting arm securely together, a pair of studs extending from the reinforcing bar on the side opposite the supporting arm, said studs being arranged for insertion through apertures in the automobile body, a clamping member connecting said studs and slidable thereon at the interior of the automobile body, and nuts threaded on the ends of said studs to secure the device to said automobile body.

3. A mounting for a rear view mirror on an automobile body comprising a hollow sheet metal base plate having a reinforcing member housed therein and formed to replace the section of garnish or belt line molding between the door and hood of the automobile, said base plate having apertures adapted to register with recesses formed within said reinforcing member, a mirror supporting arm fitting against said base plate and provided with pins or studs extending through the apertures in said plate into said recesses, means including a screw and dowels for locking said reinforcing member, base plate and mirror supporting arm securely together, a pair of studs extending from the reinforcing bar on the side opposite the supporting arm, said studs being arranged for insertion through apertures in the automobile body, a clamping member connecting said studs and slidable thereon at the interior of the automobile body, and nuts threaded on the ends of said studs to secure the device to said automobile body.

4. A rear view mirror assembly, comprising a hollow sheet metal molding section, a reinforcing member housed within said section, and a mirror supporting bracket attachable to said section and member, the outer wall of the molding section being contoured to provide an outwardly projecting portion fitting within a correspondingly shaped hollow portion in the end of the bracket and the reinforcing member having a similarly contoured portion fitting within the said contoured portion of the outer wall of the molding section, whereby said bracket, molding section and reinforcing member will be held against relative movement when secured together.

5. A rear view mirror assembly for a vehicle body having a belt line molding provided with a removable section, comprising a mirror unit and a shank attached at its outer end thereto, a hollow attaching plate comprising a single longitudinal section having a reinforcing member independent of said plate housed from end to end therein, a plurality of devices operatively connecting the inner end of said shank to said attaching plate and reinforcing member at longitudinally spaced points and adapted to secure the shank to said plate and member and also to prevent turning of the shank thereon, said attaching plate concealing and separating the reinforcing member from the inner end of the shank and being shaped and dimensioned like the said section of the molding and mounted in place of the said removable section in alinement with and entirely between the separated ends of the fixed portion of the molding thereby forming a substantially continuous portion of the molding, and means secured to said reinforcing member for attaching the assembly to the body.

6. A mounting for a rear view mirror on an automobile having a molding along a side of the body, said mounting comprising an elongated base including a sheet metal channel shaped shell shaped, dimensioned and designed substantially like said molding and constructed to form a continuation of the molding, said base also including a metal bar housed from end to end within and concealed by the shell and shaped to fit against the inner face thereof, a mirror supporting arm extending outwardly from said shell, the inner end of said arm terminating at said shell and separated from said metal bar by the shell, a mirror carried by said arm, means for securing and keying the bar and shell to the end of the arm including a threaded element passing through the bar and threaded into the inner end of the arm, and fastening means separate from said keying means and spaced therefrom for securing the bar to the body entirely beyond a separated end of said molding.

7. A rear view mirror assembly for a vehicle body having a molding, a mirror supporting arm extending outwardly from said molding, said molding comprising an outer hollow sheet metal section forming a part thereof, a reinforcing member mounted therein, the reinforcing member being concealed by said sheet metal section, the inner end of said arm terminating at said section and separated from the reinforcing member by said section, the outer wall of said section being contoured to provide an outwardly projecting portion fitting within a correspondingly shaped hollow portion in the inner end of said arm and the reinforcing member having a similarly contoured portion fitting within said contoured portion of the outer wall of said section, means for securing said arm to the base and concealed by said section, and means separate from said securing means extending from said reinforcing member and spaced from said securing means longitudinally of the reinforcing member for attaching the assembly to the vehicle body.

8. A rear view mirror assembly, comprising a hollow sheet metal molding section, a reinforcing member housed from end to end within said section, and a mirror supporting bracket attachable to said section and member, the inner end of said bracket terminating at said section and separated from said reinforcing member by said section, the outer wall of the molding section intermediate the ends thereof being contoured to provide an outwardly projecting portion fitting within a correspondingly shaped hollow portion in the end of the bracket and the reinforcing member having a similarly contoured portion fitting within the said contoured portion of the outer wall of the molding section, whereby said bracket, molding section and reinforcing member will be held against relative turning movement when secured together, and means secured to said reinforcing member and concealed by the molding section for securing the assembly to a vehicle body outer wall.

LOWELL F. SARNES.